(12) United States Patent
Hasegawa et al.

(10) Patent No.: US 7,028,648 B2
(45) Date of Patent: Apr. 18, 2006

(54) MULTIPLE CYLINDER INTERNAL COMBUSTION ENGINE

(75) Inventors: Kunio Hasegawa, Ikeda (JP); Eiji Mishima, Ikeda (JP); Toshihiro Imanishi, Ikeda (JP); Kazunori Nishikawa, Ikeda (JP); Takeshi Serizawa, Ikeda (JP); Yoshiki Morinaga, Ikeda (JP)

(73) Assignee: Daihatsu Motor Co., Ltd., Osaka (JP)

( * ) Notice: Subject to any disclaimer, the term of this patent is extended or adjusted under 35 U.S.C. 154(b) by 0 days.

(21) Appl. No.: 10/474,525

(22) PCT Filed: Nov. 26, 2001

(86) PCT No.: PCT/JP01/10292

§ 371 (c)(1),
(2), (4) Date: Oct. 8, 2003

(87) PCT Pub. No.: WO02/084088

PCT Pub. Date: Oct. 24, 2002

(65) Prior Publication Data

US 2004/0123820 A1  Jul. 1, 2004

(30) Foreign Application Priority Data

Apr. 9, 2001 (JP) .............................. 2001-110220
Apr. 20, 2001 (JP) .............................. 2001-123078

(51) Int. Cl.
*F02M 25/07* (2006.01)

(52) U.S. Cl. ..................................................... 123/58.8

(58) Field of Classification Search ............... 123/58.8, 123/568.11, 568.13, 568.12, 316
See application file for complete search history.

(56) References Cited

U.S. PATENT DOCUMENTS

| 4,321,892 A | * | 3/1982 | Anger ........................ 123/58.8 |
| 4,787,343 A | * | 11/1988 | Tuckey ...................... 123/58.8 |
| 5,647,309 A | * | 7/1997 | Avery ........................ 123/58.8 |
| 6,178,933 B1 | * | 1/2001 | Lavy .......................... 123/58.8 |
| 6,308,666 B1 | * | 10/2001 | Drecq ......................... 123/58.8 |
| 6,425,381 B1 | * | 7/2002 | Rammer ................. 123/568.12 |
| 6,427,644 B1 | * | 8/2002 | Dabadie et al. ............. 123/58.8 |
| 6,431,128 B1 | * | 8/2002 | Dabadie ..................... 123/58.8 |
| 6,543,398 B1 | * | 4/2003 | Roberts et al. ............. 123/58.8 |

FOREIGN PATENT DOCUMENTS

EP  0953745  11/1999

(Continued)

OTHER PUBLICATIONS

"Proceedings 782" Society of Automotive Engineers of Japan, Inc.

*Primary Examiner*—Henry C. Yuen
*Assistant Examiner*—Jason Benton
(74) *Attorney, Agent, or Firm*—Hamre, Schumann, Mueller & Larson, P.C.

(57) ABSTRACT

A multicylinder internal combustion engine is provided with a plurality of cylinders sharing a single crankshaft. The combustion characteristics in the respective cylinders is improved by taking out part of combustion (expansion) gas produced in one of the cylinders at an earlier stage of the explosion (expansion) stroke, and then introducing the gas into another one of the cylinders in the suction or compression stroke.

10 Claims, 11 Drawing Sheets

FOREIGN PATENT DOCUMENTS

| | | |
|---|---|---|
| JP | 56-152857 | 11/1981 |
| JP | 3-64625 | 3/1991 |
| JP | 03064625 A * | 3/1991 |
| JP | 5-157008 | 6/1993 |
| JP | 5-187326 | 7/1993 |
| JP | 5-83351 | 11/1993 |
| JP | 6-299942 | 10/1994 |
| JP | 9-068109 | 3/1997 |
| JP | 11-343887 | 12/1999 |
| JP | 2000-282867 | 10/2000 |

* cited by examiner

MULTIPLE CYLINDER INTERNAL COMBUSTION ENGINE

TECHNICAL FIELD

The present invention relates to a multicylinder internal combustion engine including a plurality of cylinders sharing a single crankshaft.

BACKGROUND ART AND PROBLEMS TO BE SOLVED BY THE INVENTION

"Scientific Lecture Meeting Preprints 782", published in October, Showa 53, by Society of Automotive Engineers of Japan, INC., includes an article [45] Combustion Analysis of Gasoline Engines -from the Viewpoint of Intermediate Combustion Product-(pages 353–362). This article says that burning of gasoline-air mixture starts with the generation of active intermediate products or radicals such as CH- and OH-groups, and then successive burning of the active radicals will follow. Further, it suggests that the active radicals in mixture of air and hydrocarbon fuel such as gasoline can reduce the ignition temperature and ignition pressure for the mixture, thereby contributing to the improvement in combustion characteristics of the mixture.

In light of the above, the present invention is proposed to improve the combustion characteristics of the gas mixture in the cylinders of a multicylinder internal combustion engine that consumes a hydrocarbon fuel such as gasoline, or hydrogen fuel.

Regarding prior arts which may be relevant to the present invention, JP-A-H05-157008 and JP-A-2000-282867 teach that:

"A pressure accumulation chamber is designed to communicate with a combustion chamber so that part of combustion (expansion) gas during the explosion (expansion) stroke is stored in the pressure accumulation chamber, and the stored combustion (expansion) gas is discharged into the combustion chamber during the suction stroke or the compression stroke."

Further, JP-U-H05-83351, JP-A-H05-187326 and JP-A-H09-68109 teach that:

"In a multicylinder internal combustion engine with a plurality of cylinders sharing a crankshaft, part of combustion (expansion) gas in one cylinder undergoing the explosion (expansion) stroke is introduced into another cylinder undergoing the suction stroke or the compression stroke."

The radicals, generated in burning gas mixture, increase in amount when the combustion temperature rises, but they are turned into stable substances such as carbon monoxide, hydrogen or methane as the combustion temperature drops. Thus, their activity is highly temperature-dependent and degrades with a drop in temperature.

According to the former group of prior arts mentioned above, part of combustion (expansion) gas in the explosion (expansion) stroke is stored in the pressure accumulation chamber, and the stored gas is discharged during the suction stroke or the compression stroke. With this arrangement, the temperature of the combustion (expansion) gas stored in the pressure accumulation chamber drops greatly as the process proceeds from the explosion (expansion) stroke to the suction stroke or compression stroke through the discharge stroke. As a result, most of the radicals contained in the stored combustion (expansion) gas will disappear by turning into unexcited products or stable produces (such as CO, HC, $H_2$ and $H_2O$) Thus, the former group of prior arts can increase the compression pressure and decrease NOx by the effect of EGR, but cannot improve the combustion characteristics of gas mixture by radicals to be generated by combustion.

The latter group of prior arts mentioned above is merely designed to perform recirculation of exhaust gas into the suction stroke for the purposes of reducing NOx by the EGR effect. Specifically, part of exhaust gas is drawn from a cylinder at the substantial end of its explosion (expansion) stroke to be introduced into another cylinder. Since the combustion temperature has been dropped considerably by the end of the explosion (expansion) stroke, most of the radicals in the combustion (expansion) disappear by turning into stable products. Therefore, the introduction of the combustion (expansion) gas into another cylinder cannot improve the combustion characteristics of gas mixture in the cylinder.

The objective of the present invention is to ensure that the combustion characteristics of gas mixture in the cylinders of a multicylinder internal combustion engine is improved by utilizing the radicals generated by combustion in the cylinders.

DISCLOSURE OF THE INVENTION

According to a first aspect of the present invention, there is provided a multicylinder internal combustion engine provided with a plurality of cylinders sharing a single crankshaft. The engine comprises arrangement for the respective cylinders, whereby part of combustion (expansion) gas is taken out from one of the cylinders at an earlier stage of an explosion (expansion) stroke, and introduced into another cylinder of the remaining cylinders in a suction stroke or compression stroke through a communication path.

FIGS. 9, 10 and 11 illustrate the relationship between the crank angle and the cylinder pressure or the combustion temperature in a four-stroke, three-cylinder internal combustion gasoline engine with a total displacement of 660 cc, the revolution per minute being 2000, 4000 and 6000, respectively.

As indicated by the solid curve line C in these figures, the combustion temperature in a cylinder rapidly rises immediately after the ignition which occurs at around the top dead center at a crank angle of substantially 0 degree to reach the maximum temperature and rapidly drops when the exhaust valve is opened at a crank angle of substantially 120 degrees. Thus, the combustion temperature is high in an earlier stage in the explosion (expansion) stroke, i.e. the time period from the top dead center to the time when the crank angle becomes about 120 degrees, so that the combustion (expansion) gas produced in this time period contains a large amount of active radicals of a so-called high energy level.

Further, as indicated by the dotted curve D, the pressure in the cylinder rapidly rises immediately after the ignition to reach the maximum pressure and then drops. Thus, the pressure is high during the first half of the explosion (expansion) stroke.

With the above-noted arrangement, in which part of combustion (expansion) gas produced in one of the cylinders at an earlier stage of the explosion (expansion) stroke is taken out for introduction into another cylinder in a suction stroke or a compression stroke, it is possible to take out part of combustion (expansion) gas which has a high temperature and hence contains a large amount of active radicals. Then, the extracted part of the combustion (expansion) gas is introduced, via a communication path, into another cylinder which is in a suction stroke or a compression stroke. As a result, the combustion characteristics of gas mixture in the cylinders can be reliably and greatly increased by the radicals produced by the previous combustion of the gas mixture in the cylinders.

According to a second aspect of the present invention, a compression ratio in each of the cylinders is set to such a high value as would lead to abnormal combustion such as knocking during high-load operation. The engine further comprises arrangement for the respective cylinders during the high-load operation, whereby part of combustion (expansion) gas is taken out from one of the cylinders at an earlier stage of an explosion (expansion) stroke, and introduced into another cylinder of the remaining cylinders in a suction stroke or compression stroke through a communication path.

By taking out part of combustion (expansion) gas from one of the cylinders at an earlier state during the explosion (expansion) stroke, the combustion pressure is lowered. Thus, it is possible to prevent abnormal combustion such as knocking during high-load operation from occurring.

The combustion (expansion) gas taken out at the earlier stage in the explosion (expansion) stroke contains a large amount of radicals, which is active and has a high energy level due to the high temperature of the combustion (expansion) gas. By introducing the taken-out combustion (expansion) gas into one of the cylinders that is undergoing the suction or compression stroke, the combustion characteristics in the cylinder can be considerably improved by the radicals contained in the supplied combustion (expansion) gas. The combustion characteristics improvement contributes to the increase in output of power. Thus, it is possible to compensate for the power reduction due to the partial extraction of the combustion (expansion) gas at the earlier stage of the explosion (expansion) stroke.

A high compression ratio may be adopted to increase the mileage and the output during the frequently utilized low- or middle-load operation. Even in such a case, abnormal combustion such as knocking during a high-load operation can be reliably prevented, and no power reduction occurs.

According to a third aspect of the present invention, a single common communication path is provided which extends along a row of the cylinders and which is connected to combustion chambers of the cylinders via communication paths provided for respective cylinders. Each of the communication paths is provided with an open/close valve which opens at an earlier stage in an explosion (expansion) stroke of the cylinder for introducing part of combustion (expansion) gas produced in the cylinder into another one of the cylinders which is in a suction stroke or a compression stroke.

With this arrangement, heated combustion (expansion) gas resulting from the combustion (expansion) in any one of the cylinders will flow back and forth through the single common communication path at short intervals. Accordingly, the common communication path can be heated to a higher temperature than a communication path that would connect two cylinders to each other but to the others. Thus, the combustion (expansion) gas taken out from one cylinder does not largely decrease its temperature in passing through the common communication path. The heated combustion gas, containing a large amount of radicals, can be introduced into another cylinder in a suction stroke or a compression stroke. Further, the design of a single common communication path for all the cylinders can simplify the forming of communication means among the cylinders.

According to a fourth aspect of the present invention, a single common communication path is provided which extends along a row of the cylinders and which is connected to combustion chambers of the cylinders via communication paths provided for the respective cylinders. Each of the paths is provided with an open/close valve. Further, each cylinder is provided with an ion current detector for detecting ion current in combustion (expansion) gas during the explosion (expansion) stroke of the cylinder so that the open/close valve of the cylinder opens when the ion current in one of the cylinders is determined to be high based on a detection signal from the ion current detector, so that part of the combustion (expansion) gas is introduced into another one of the cylinders in the suction or compression stroke.

It is known that ion current flows during the combustion of gas mixture in a cylinder, the ion current being generally proportional to the pressure in the cylinder during the combustion (See JP-A-H06-299942, for example). As seen from FIGS. 9, 10 and 11, the pressure in the cylinder during combustion is generally proportional to the combustion temperature of gas mixture.

Keeping the above in mind, ion current detecting means may be provided in each of the cylinders for detection of ion current in combustion (expansion) gas in the explosion (expansion) stroke. Based on a detection signal from the ion current detecting means, the open/close valve of the communication path for each cylinder is operated to open. With this arrangement, the taking and introducing process of part of combustion (expansion) gas from one cylinder into another cylinder in the suction stroke or the compression stroke, can be performed when the ion current is high, or the internal pressure of the cylinder is high, or the combustion temperature is high and a large amount of radicals are contained. Therefore, it is possible to more reliably improve the combustion characteristics of gas mixture in a cylinder by utilizing radicals generated in another cylinder during the combustion of fuel-air mixture.

According to a fifth aspect of the present invention, the individual communication path for each of the cylinders has an opening to the combustion chamber, the opening comprising a swirl port for causing the combustion (expansion) gas entering through the opening to flow in a swirling manner circumferentially of the cylinder. With this arrangement, the combustion (expansion) gas introduced in each cylinder can be dispersed uniformly in the entire gas mixture in the cylinder, and further improvement of the combustion characteristics of gas mixture can be expected.

According to a sixth aspect of the present invention, the individual communication path for each of the cylinders is provided with a plurality of openings to the combustion chamber. With this arrangement, the combustion (expansion) gas can be introduced into each cylinder through the plurality of openings so that the combustion (expansion) gas can be dispersed uniformly in the entire gas mixture in the cylinder. Accordingly, further improvement of the combustion characteristics of the gas mixture can be expected.

According to a seventh aspect of the present invention, each of the cylinders is provided with a fuel injection valve for injecting fuel into a cylinder bore of the cylinder. The fuel and air supplied by the fuel injection valve can be greatly activated by the radicals contained in the combustion (expansion) gas introduced in the cylinder, so that the combustion characteristics can be further improved.

According to an eighth aspect of the present invention, the common communication path is provided in a cylinder head. With this arrangement, the common communication path can be kept at a higher temperature, which prevents a temperature drop of the combustion (expansion) gas reliably.

According to a ninth aspect of the present invention, the open/close valve of the individual communication path for each cylinder comprises a poppet valve. With this arrangement, the valve can endure the high pressure in the cylinder, and can be reliably opened or closed.

BEST MODE FOR CARRYING OUT THE INVENTION

Preferred embodiments of the present invention will be described below with reference to the accompanying drawings.

Figure 1:
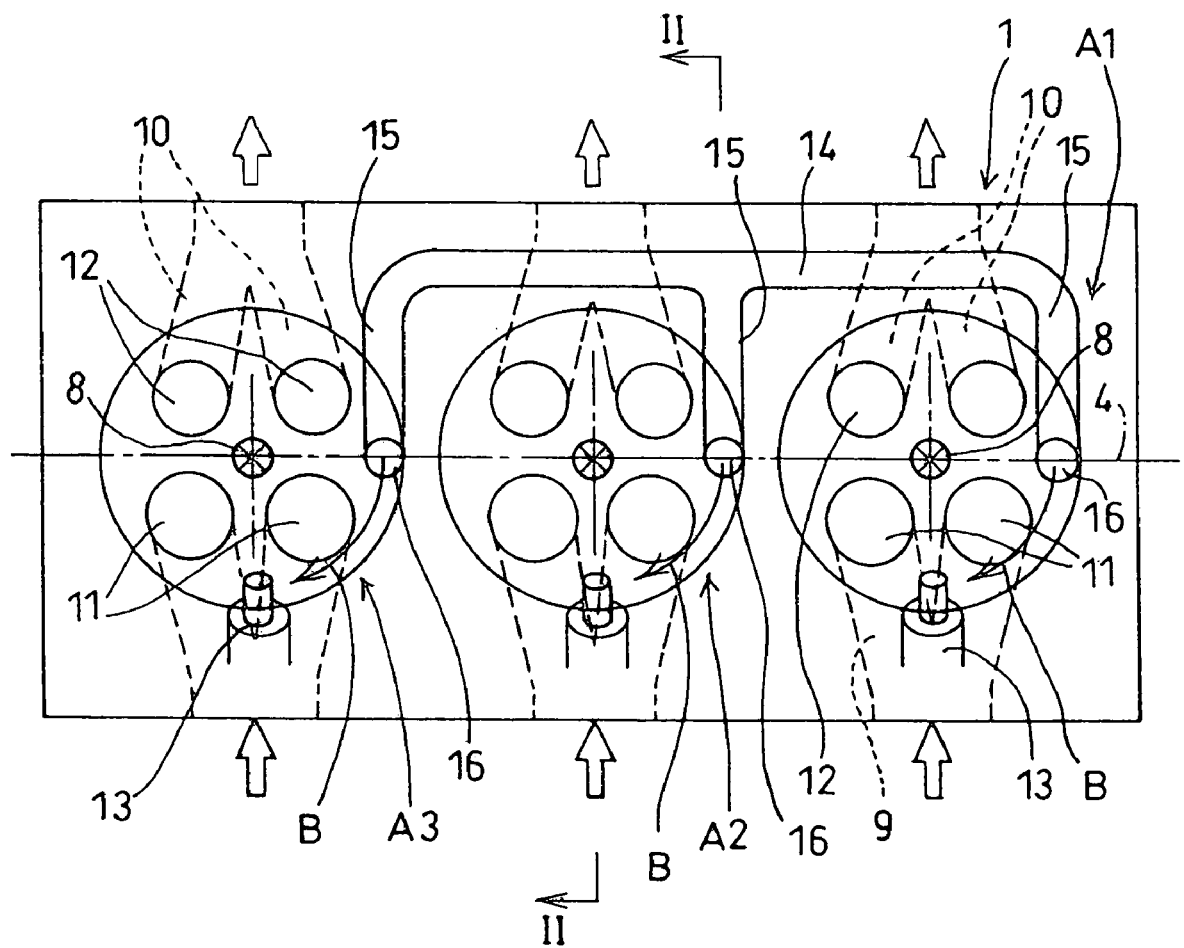
FIG. 1 is a plan view illustrating a three-cylinder internal combustion engine according to a first embodiment of the present invention.
Figure 2:
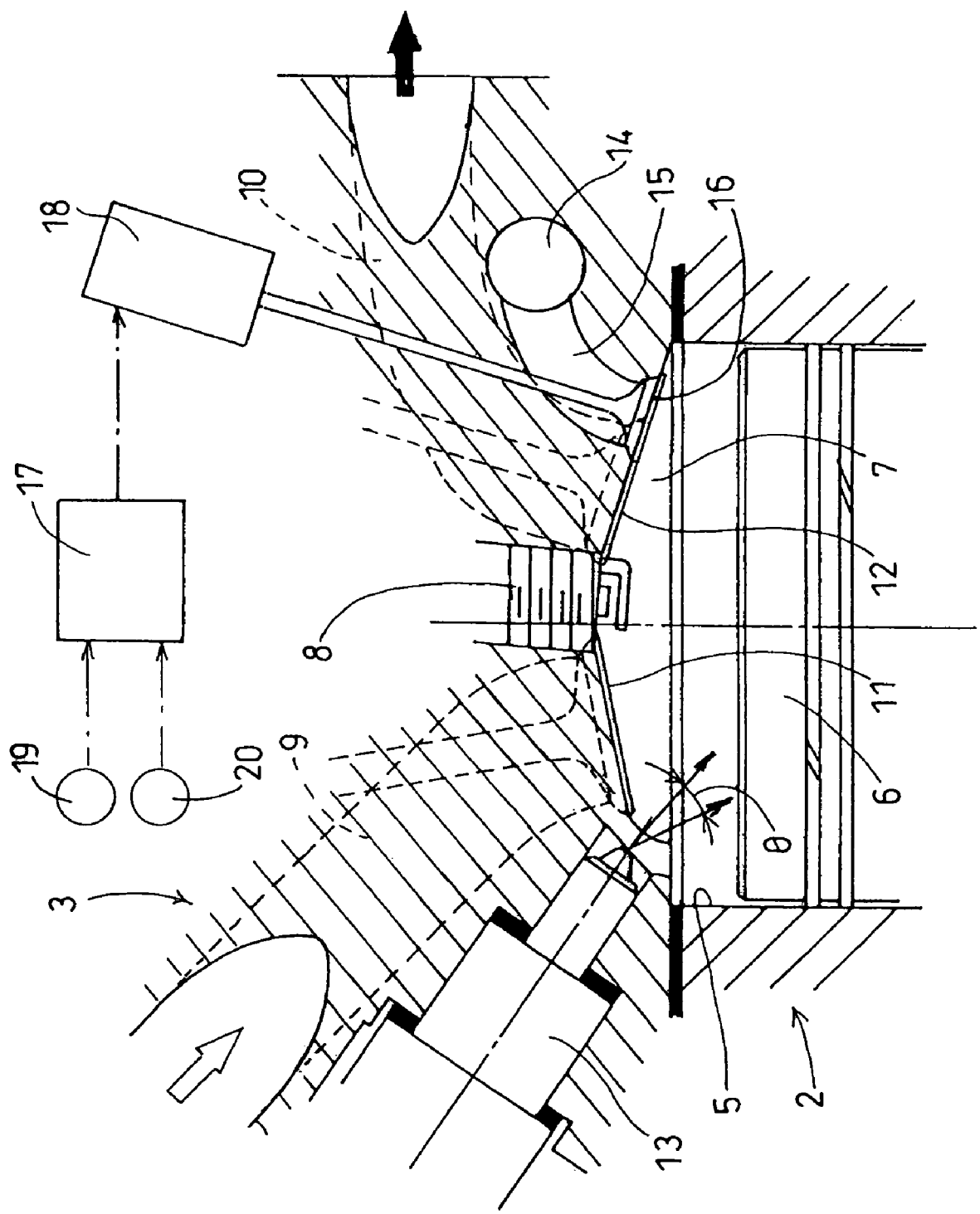
FIG. 2 is a vertical section taken along lines II—II in FIG. 1 and viewed from the front side.
Figure 3:
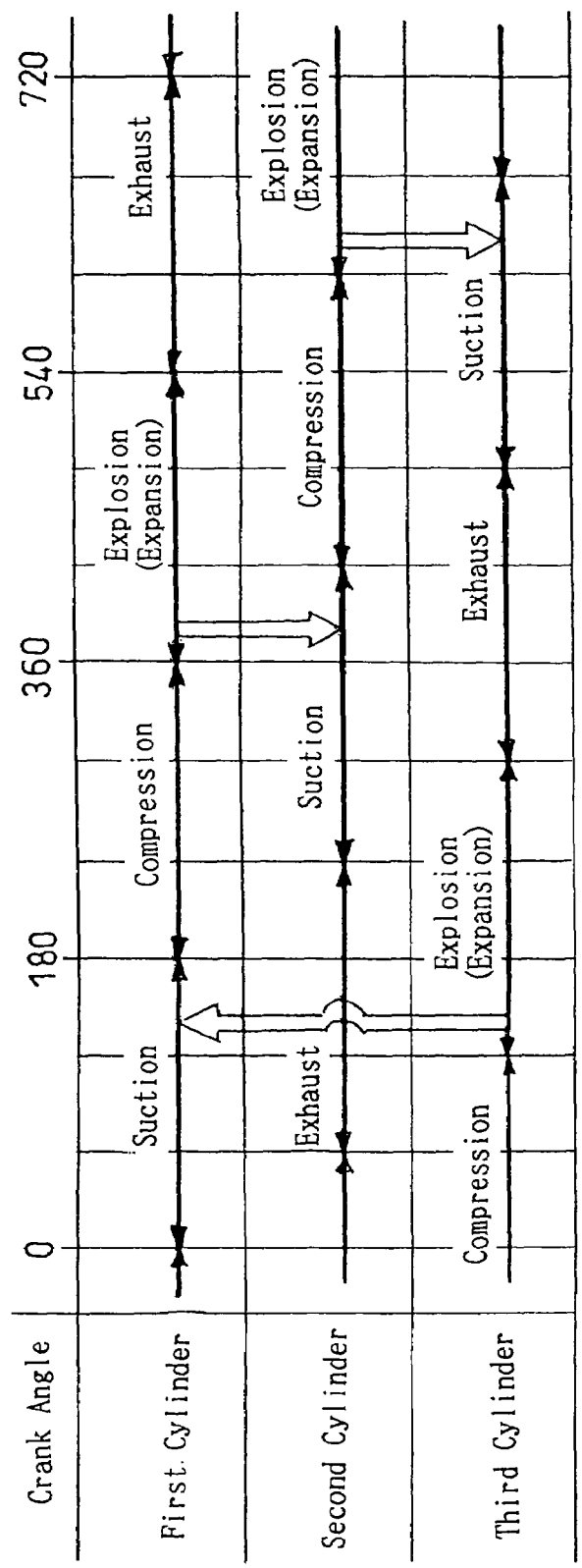
FIG. 3 illustrates strokes in each cylinder of the three-cylinder internal combustion engine.
Figure 4:
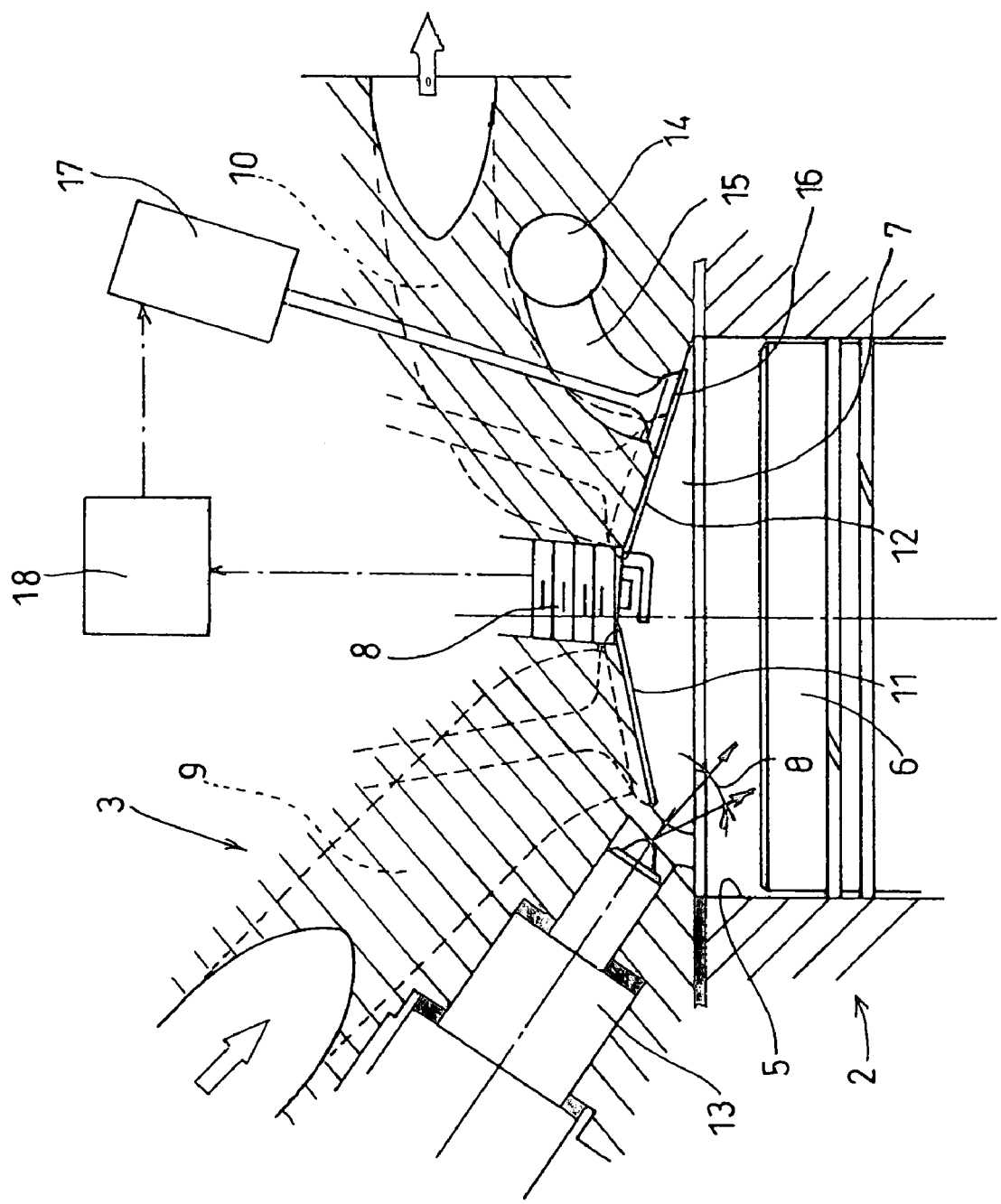
FIG. 4 is an enlarged vertical section, as viewed from the front side, illustrating a principal portion of a second embodiment.

FIGS. 1–3 illustrate a first embodiment of the present invention applied to a conventional in-line three-cylinder four-stroke internal combustion engine.

The three-cylinder internal-combustion engine 1 comprises a cylinder block 2, a cylinder head 3 secured to an upper surface of the cylinder block. A first cylinder A1, a second cylinder A2 and a third cylinder A3, which share a non-illustrated single crank shaft, are arranged in a row extending along a crank axis 4.

Each of the three cylinders A1, A2 and A3 is provided with a cylinder bore 5 provided in the cylinder block 2, a piston 6 which moves reciprocally in the cylinder bore 5, a combustion chamber 7 provided as a recess at a lower surface of the cylinder head 3 to open to the cylinder bore 5, a spark plug 8 attached to the cylinder head 3 to face a generally central portion of the combustion chamber 7, two intake ports 9 provided at the cylinder head 3 for opening to the combustion chamber 7, and two exhaust ports 10 provided at the cylinder head 3 for opening to the combustion chamber 7.

Each of the cylinders A1, A2 and A3 is further provided with a poppet intake valve 11 for opening and closing the opening of the intake port 9 to the combustion chamber 7 by an intake valve cam shaft (not shown) which rotates in accordance with the crank shaft, and provided with a poppet exhaust valve 12 for opening and closing the opening of the exhaust port 10 to the combustion chamber 7 by an exhaust valve cam shaft (not shown) which rotates in accordance with the crank shaft.

Each of the cylinders A1, A2 and A3 is further provided with a fuel injection valve 13 arranged between the two intake ports 9 for injecting fuel into the cylinder bore 5 to spread conically with an appropriate angle e in the suction stroke in which the piston 5 moves downward.

In this embodiment, ignition for the cylinders A1, A2 and A3 is performed in the order of the first cylinder A1, the second cylinder A2, and then the third cylinder A3, as is clear from the stroke chart shown in FIG. 3.

The cylinder head 3 is provided with a common communication path 14 which is common to the cylinders A1, A2 and A3 and which extends in the direction of the row of the cylinders. The common communication path 14 is connected to the combustion chamber of each cylinder A1, A2, A3 via a communication path 15 provided for each cylinder. Each communication path 15 has an opening to the combustion chamber 7 of the cylinder A1, A2 or A3, which comprises a swirl port extending tangentially to the cylinder bore 5 in plan view (FIG. 1). The opening is provided with a poppet open/close valve 16 for opening and closing the opening. The open/close valves of the cylinders A1, A2 and A3 are opened at the same time and remain open for a predetermined period of time at an earlier stage during the explosion (expansion) stroke and at a later stage during the suction stroke. The operation of the valves 16 is performed by utilizing the exhaust valve cam shaft (not shown) for opening and closing the exhaust valve 12 in accordance with the rotation angle (crank angle) of the crank shaft.

With this arrangement, the open/close valve 16 of the first cylinder A1 opens for a predetermined time period at an earlier stage in the explosion (expansion) stroke of the first cylinder A1. At the same time, the open/close valve 16 of the second cylinder A2 in the suction stroke, opens for the predetermined time period. As a result, part of combustion (expansion) gas in the first cylinder A1 is introduced into the second cylinder A2 through the common communication path 14.

Then, the open/close valve 16 of the second cylinder A2 opens for a predetermined time period at an earlier stage in the explosion (expansion) stroke of the second cylinder A2. At the same time, the open/close valve 16 of the third cylinder A3 in the suction stroke, opens for the predetermined time period. As a result, part of combustion (expansion) gas in the second cylinder A2 is introduced into the third cylinder A3 through the common communication path 14.

Then, the open/close valve 16 of the third cylinder A3 opens for a predetermined time period at an earlier stage in the explosion (expansion) stroke of the third cylinder A3. At the same time, the open/close valve 16 of the first cylinder A1 in the suction stroke, opens for the predetermined time period. As a result, part of combustion (expansion) gas in the third cylinder A3 is introduced into the first cylinder A1 through the common communication path 14.

In this way, part of combustion (expansion) gas in one of the three cylinders A1, A2 and A3 can be taken out and introduced into another one of the remaining cylinders which is in a suction stroke or a compression stroke through the single common communication path 14. The taking out of combustion (expansion) gas is performed at an earlier stage in the explosion (expansion) stroke of each cylinder. Further, the common communication path 14 is kept at a high temperature, because combustion (expansion) gas flows through the path successively from the first cylinder A1 to the second cylinder A2, from the second cylinder A2 to the third cylinder A3 and from the third cylinder A3 to the first cylinder A1 at short time intervals. Therefore, combustion (expansion) gas taken out from each cylinder A1, A2, A3 has a high temperature and can pass through the communication path 14 without largely decreasing its temperature, so that the gas can be introduced into another cylinder, which is in a suction stroke or a compression stroke, the gas keeping the high temperature and hence keeping the high content of radicals.

Figure 9:
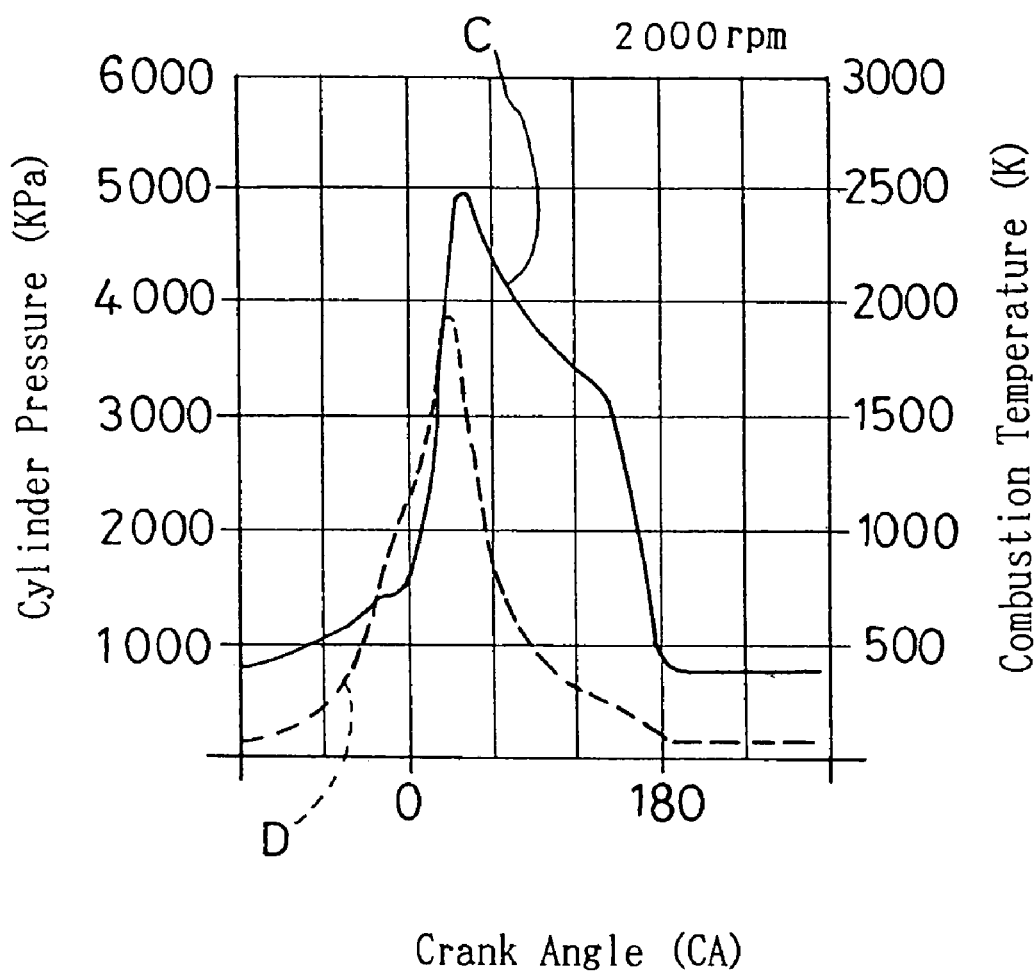
FIG. 9 illustrates the relationship between the crank angle and the cylinder pressure or the combustion temperature in a three-cylinder internal combustion engine, the revolution per minute being 2000.
Figure 10:
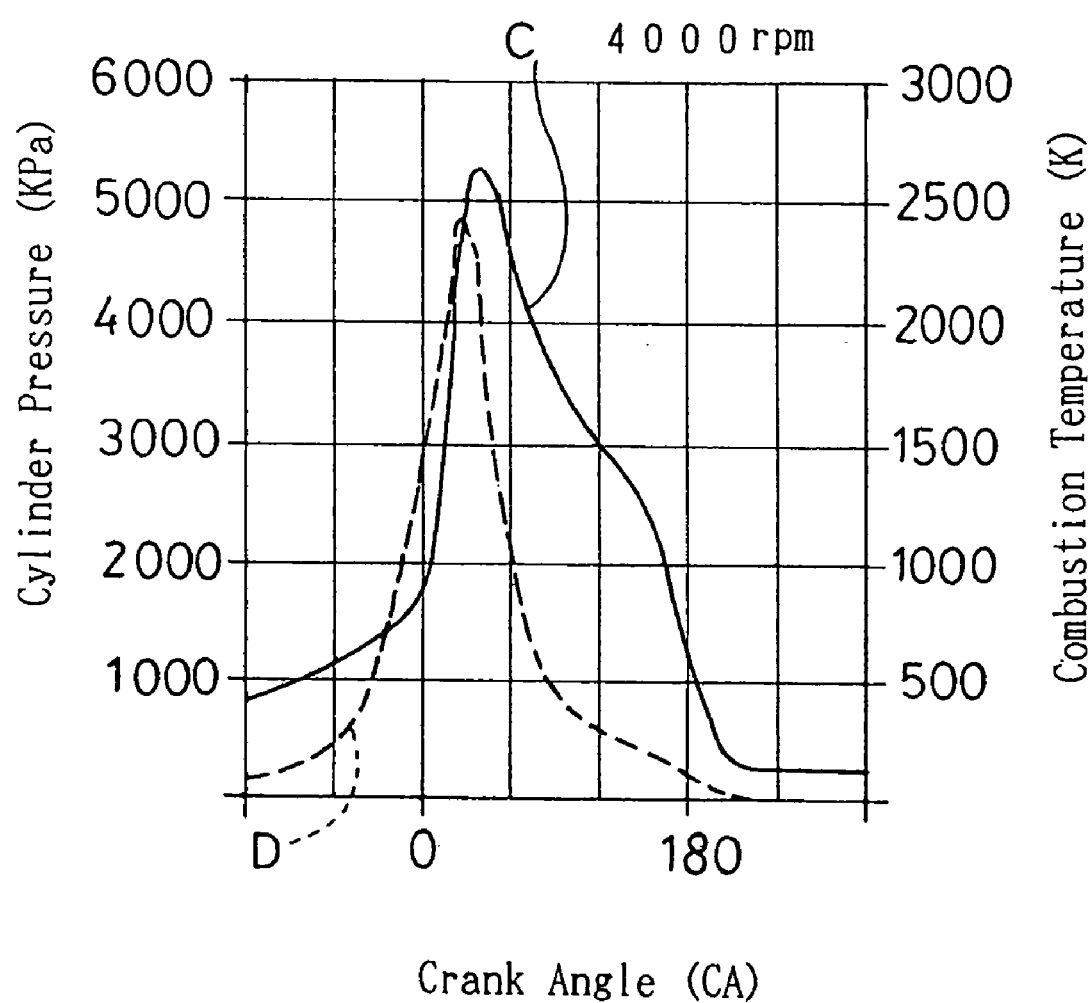
FIG. 10 illustrates the relationship between the crank angle and the cylinder pressure or the combustion temperature in the three-cylinder internal combustion engine, the revolution per minute being 4000.
Figure 11:
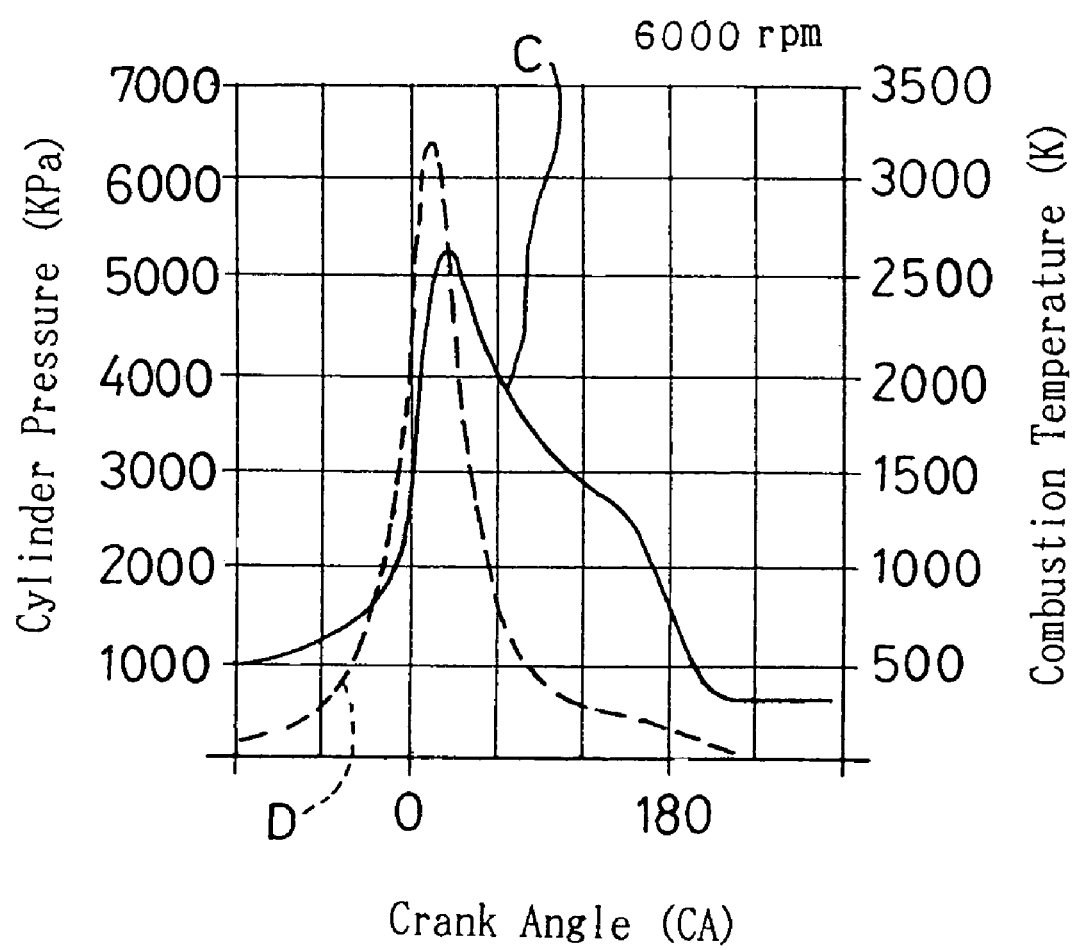
FIG. 11 illustrates the relationship between the crank angle and the cylinder pressure or the combustion temperature in a three-cylinder internal combustion engine, the revolution per minute being 6000.

As will be understood from FIGS. 9, 10 and 11, it is preferable that each open/close valve 16 opens at an earlier stage during the combustion (expansion) stroke of the cylinder, in particular when the combustion temperature is no less than 1500K. In the cases shown in FIGS. 9, 10 and 11, the open/close valve should be opened before the exhaust valve 12 opens at a crank angle of about 120 degrees.

The opening of the communication path 15 of each cylinder A1, A2, A3 to the combustion chamber 7 comprises a swirl port which provides the combustion (expansion) gas entering through the opening with swirling flow along the circumference of the cylinder bore 5, as indicated by an arrow B. Therefore, the combustion (expansion) gas introduced into each cylinder A1, A2, A3 can be dispersed generally uniformly in the entire gas mixture in the cylinder.

Such uniform dispersion of the introduced combustion (expansion) gas in the entire gas mixture in the cylinder can be realized also by providing the communication path 15 of each cylinder with a plurality of openings, each of which may comprise a swirl port.

In each of the cylinders A1, A2 and A3, air and fuel supplied into the cylinder bore 5 by the fuel injection valve 13 during the suction stroke can be activated by the radicals contained in the combustion (expansion) gas introduced into the cylinder.

Instead of injecting fuel into the cylinder bore 5 during the suction stroke (homogeneous combustion) as in the above-described internal fuel injection system, the fuel may be injected into a cavity formed in the top surface of the piston 6 coming close to the top dead center at the end of the compression stroke (stratified charge).

In the above-described embodiment, the open/close valve 16 of each cylinder A1, A2, A3 is opened by the rotation of the crankshaft. Instead, however, electrical opening/closing means such as a magnetic coil 17 as shown in FIG. 2 may be provided for causing the open/close valve to open for a predetermined time period at a predetermined crank angle, i.e. at an earlier stage in the explosion (expansion) stroke and in the suction stroke of the cylinder.

In the case where the open/close valve 16 is opened by such electrical opening/closing means as the magnetic coil 17, each of the cylinders A1, A2 and A3 may be provided with ion current detector for detecting ion current in the combustion (expansion) gas during the explosion (expansion) stroke. Based on detection signals from the ion current detector, the open/close valves 16 of one cylinder in which the ion current is high is opened so that part of the combustion (expansion) gas of the cylinder is introduced into another cylinder in a suction stroke or a compression stroke.

JP-B-S54-27277, for example, discloses ion current detecting means utilizing a spark plug. The ion current detecting means 18 as disclosed in JP-B-S54-27277 maybe applied to the spark plug 8 of each cylinder A1, A2, A3. The detection signals from the ion current detecting means 18 are inputted into electrical opening/closing means, such as a magnetic coil 17, for each open/close valve 16. When the ion current in the cylinder A1, A2, A3 exceeds a predetermined value during the explosion (expansion) stroke, the open/close valve 16 is opened.

As described before, ion current generated by combustion of gas mixture is generally proportional to the pressure in the cylinder during combustion, and the pressure in the cylinder during combustion is generally proportional to combustion temperature of the gas mixture. Therefore, by causing the open/close valve 16 of each cylinder A1, A2, A3 to open when the ion current exceeds a predetermined value in the explosion (expansion) stroke, the introduction of part of combustion (expansion) gas from one cylinder into another cylinder in the suction stroke or the compression stroke can be performed only when the ion current value is high, or the internal pressure of the cylinder is high and hence the combustion temperature is high, and namely, when a large amount of radicals are contained in the combustion gas.

In a second embodiment, unlike the compression ratio of 9–10 in an ordinary four-stroke internal combustion engine burning gasoline, the compression ratio in each-cylinder A1, A2, A3 is set to such a high value of about 15–18 as may lead to abnormal combustion such as knocking during high-load operation. Further, the open/close valves 16 of the cylinders A1, A2 and A3 are operated by the electrical opening/closing means such as a magnetic coil 17 which in turn is controlled by a control circuit 21 into which signals from a load sensor 19 and a crank angle sensor 20 are inputted in accordance with e.g. the open degree of a throttle valve. With this arrangement, the cylinder valves, in a high-load operation mode, are opened at an earlier stage of the explosion (expansion) stroke of the cylinders A1, A2, A3 and at a later stage of the suction stroke, the opening of the valves being implemented at the same crank angle and at the same time, and continued for a predetermined period of time.

In the above scheme, the open/close valve 16 of each cylinder A1, A2, A3 is not opened in a low-load operation mode nor intermediate-load operation mode of the internal combustion engine 1.

During the high-load operation of the internal combustion engine 1, the open/close valve 16 of the first cylinder A1 opens at an earlier stage in the explosion (expansion) stroke of the first cylinder A1 for a predetermined time period. At the same time, the open/close valve 16 of the second cylinder A2 in the suction stroke opens for the predetermined time period. As a result, part of combustion (expansion) gas in the first cylinder A1 is introduced into the second cylinder A2 through the common communication path 14.

Then, the open/close valve 16 of the second cylinder A2 opens at an earlier stage in the explosion (expansion) stroke of the second cylinder A2 for a predetermined time period. At the same time, the open/close valve 16 of the third cylinder A3 in the suction stroke opens for the predetermined time period. As a result, part of combustion (expansion) gas in the second cylinder A2 is introduced into the third cylinder A3 through the common communication path 14.

Then, the open/close valve 16 of the third cylinder A3 opens at an earlier stage in the explosion (expansion) stroke of the third cylinder A3 for a predetermined time period. At the same time, the open/close valve 16 of the first cylinder A1 in the suction stroke opens for the predetermined time period. As a result, part of combustion (expansion) gas in the third cylinder A3 is introduced into the first cylinder A1 through the common communication path 14.

In this way, part of combustion (expansion) gas in one of the three cylinders A1, A2 and A3 can be taken out and introduced into another one of the remaining cylinders, which is in a suction stroke, through the single common communication path 14. Thus, during the high-load operation, the combustion pressure in the cylinder is reduced, which contributes to the prevention of abnormal combustion such as knocking, while the combustion characteristics in the cylinder is improved, which contributes to the increase in output power.

Figure 5:
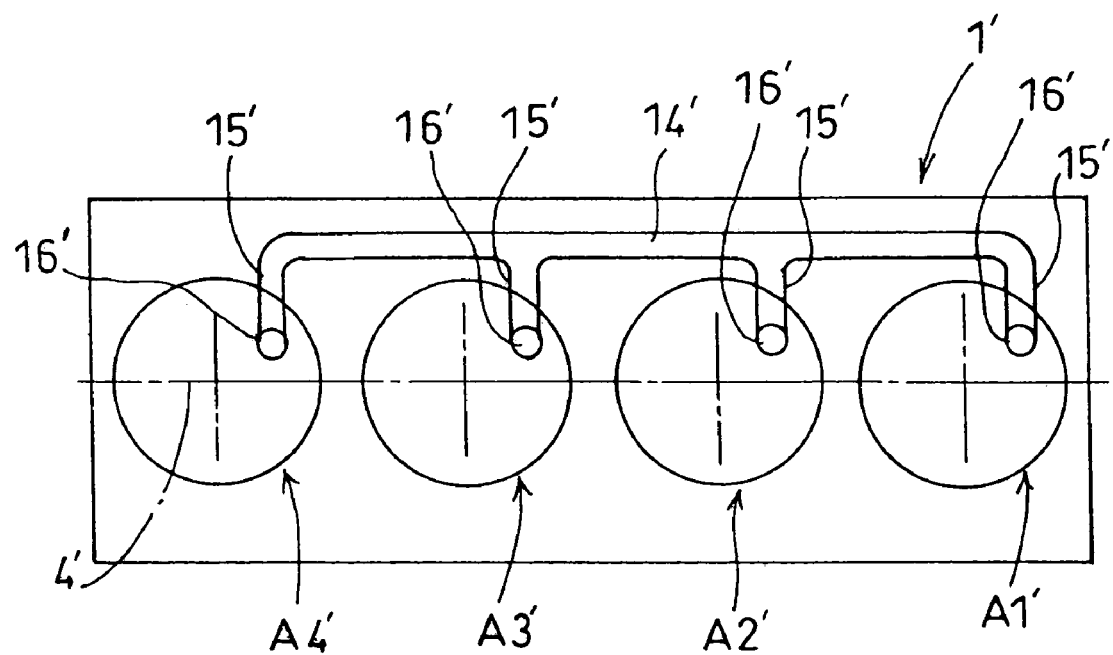
FIG. 5 is a plan view illustrating a four-cylinder internal combustion engine according to a third embodiment of the present invention.
Figure 6:
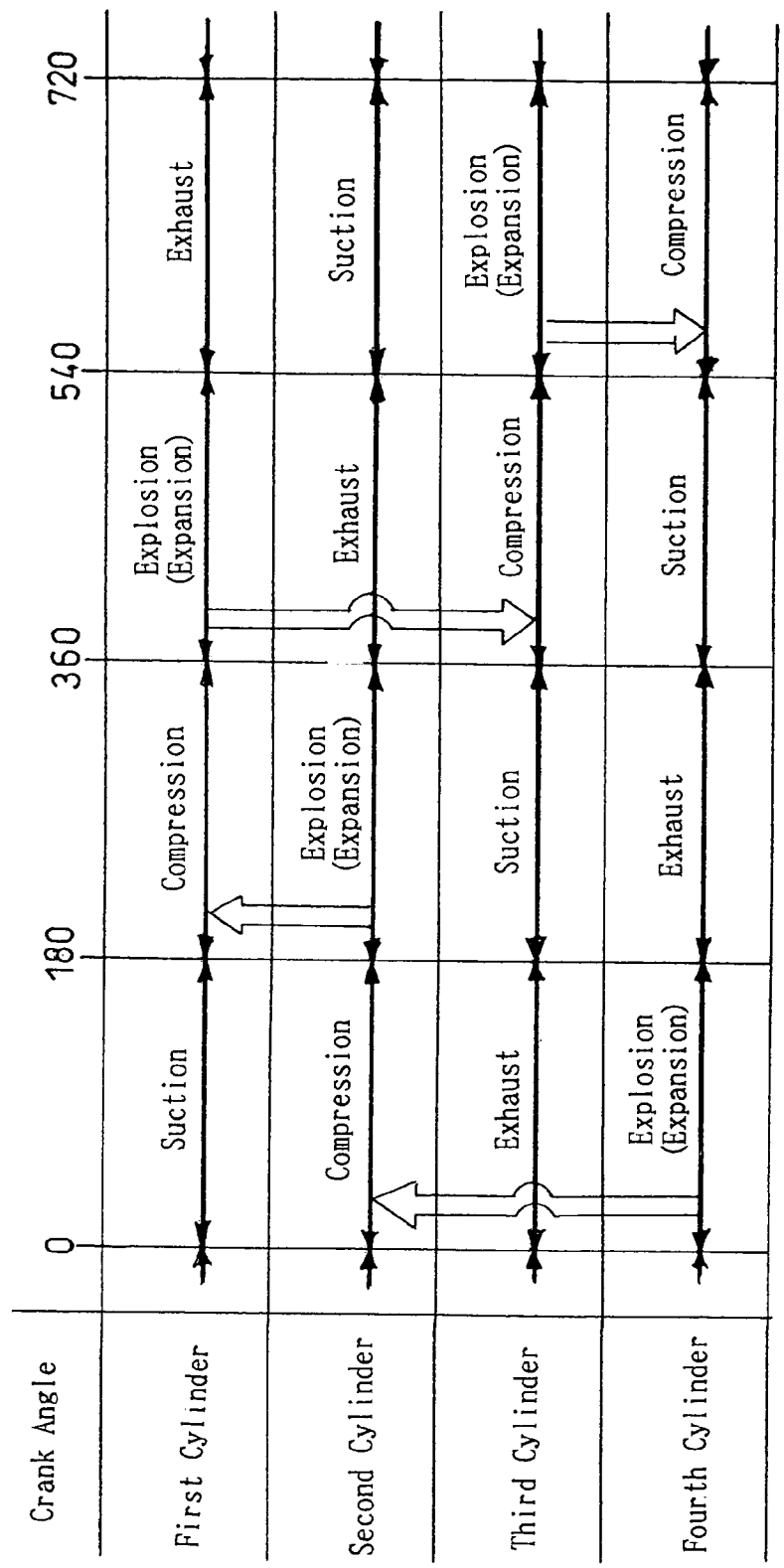
FIG. 6 illustrates strokes in each cylinder of the four-cylinder internal combustion engine.

FIGS. 5 and 6 illustrate a third embodiment of the present invention applied to a conventional four-stroke, four-cylinder internal combustion engine.

The four-cylinder internal combustion engine 1' comprises a first cylinder A1', a second cylinder A2', a third cylinder A3' and a fourth cylinder A4' which share a non-illustrated single crank shaft and which are arranged in a row extending along a crank axis 4'.

As in the first embodiment each of the cylinders A1', A2' A3' and A4' is provided with a cylinder bore, a piston, a combustion chamber, a spark plug, intake ports with intake valves, exhaust ports with exhaust valves, a fuel injection valve.

As seen from the stroke chart shown in FIG. 6, ignition for the cylinders A1', A2', A3' and A4' of the four-cylinder internal combustion engine 1' is performed in the order of the first cylinder A1', the third cylinder A3', the fourth cylinder A4', and then the second cylinder A2'.

A single common communication path 14' is provided which is common to the cylinders A1', A2', A3' and A4' and which extends along the row of the cylinders. The common communication path 14' is connected to the combustion chamber of each cylinder A1', A2', A3', A4' via a communication path 15' provided for each cylinder. Similarly to the first embodiment, the open/close valves 16' provided at respective communication paths 15' are designed so that they open at the same time and for a predetermined period of time at an earlier stage of the explosion (expansion) stroke and at a later stage of the suction stroke in accordance with the rotation of the crank shaft. With the above arrangement, the open/close valve 16' of the first cylinder A1' opens at an earlier stage in the explosion (expansion) stroke of the first cylinder A1' for a predetermined time period. At the same time, the open/close valve 16' of the third cylinder A3' in the compression stroke opens for the predetermined time period. As a result, part of combustion (expansion) gas in the first cylinder A1' is introduced into the third cylinder A3' through the common communication path 14'.

Then, the open/close valve 16' of the third cylinder A3' opens at an earlier stage in the explosion (expansion) stroke of the third cylinder A3' for a predetermined time period. At the same time, the open/close valve 16' of the fourth cylinder A4' in the compression stroke opens for the predetermined time period. As a result, part of combustion (expansion) gas in the third cylinder A3' is introduced into the fourth cylinder A4' through the common communication path 14'.

Then, the open/close valve 16' of the fourth cylinder A4' opens at an earlier stage in the explosion (expansion) stroke of the fourth cylinder A4' for a predetermined time period. At the same time, the open/close valve 16' of the second cylinder A2' in the compression stroke opens for the predetermined time period. As a result, part of combustion (expansion) gas in the fourth cylinder A4' is introduced into the second cylinder A2' through the common communication path 14'.

Then, the open/close valve 16' of the second cylinder A2' opens at an earlier stage in the explosion (expansion) stroke of the second cylinder A2' for a predetermined time period. At the same time, the open/close valve 16' of the first cylinder A1' in the compression stroke opens for the predetermined time period. As a result, part of combustion (expansion) gas in the second cylinder A2' is introduced into the first cylinder A1' through the common communication path 14'.

In the third embodiment again, the open/close valve 16' of each cylinder A1', A2', A3', A4' may be provided with ion current detecting means so that the valve can be opened when the detected ion current exceeds a predetermined value, as in the first embodiment. Further, the compression ratio in each cylinder is set high, and part of combustion (expansion) gas of one cylinder is introduced into another cylinder in the high-load operation mode.

Figure 7:
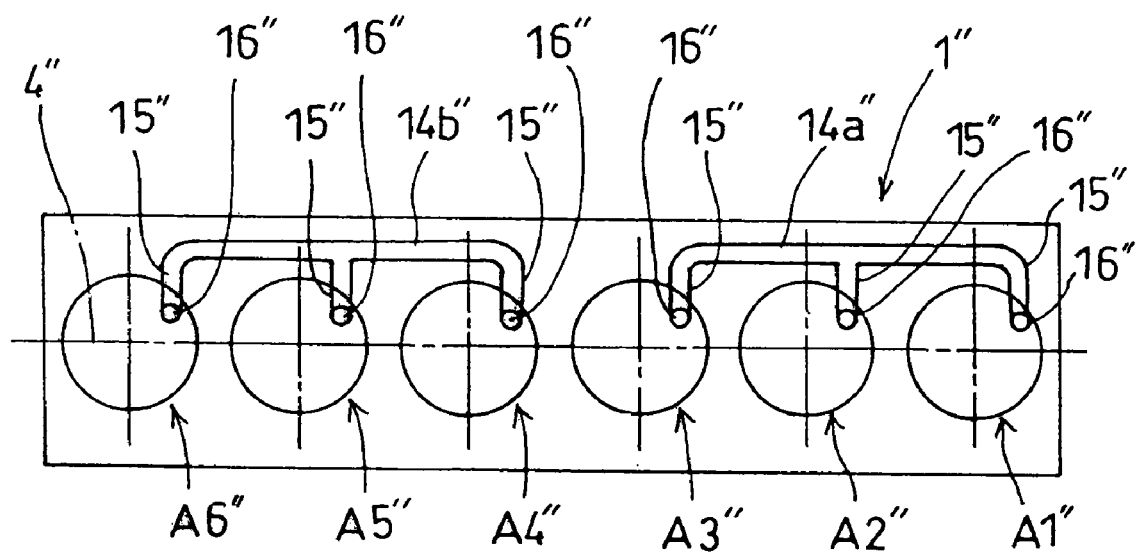
FIG. 7 is a plan view illustrating a six-cylinder internal combustion engine according to a fourth embodiment of the present invention.
Figure 8:
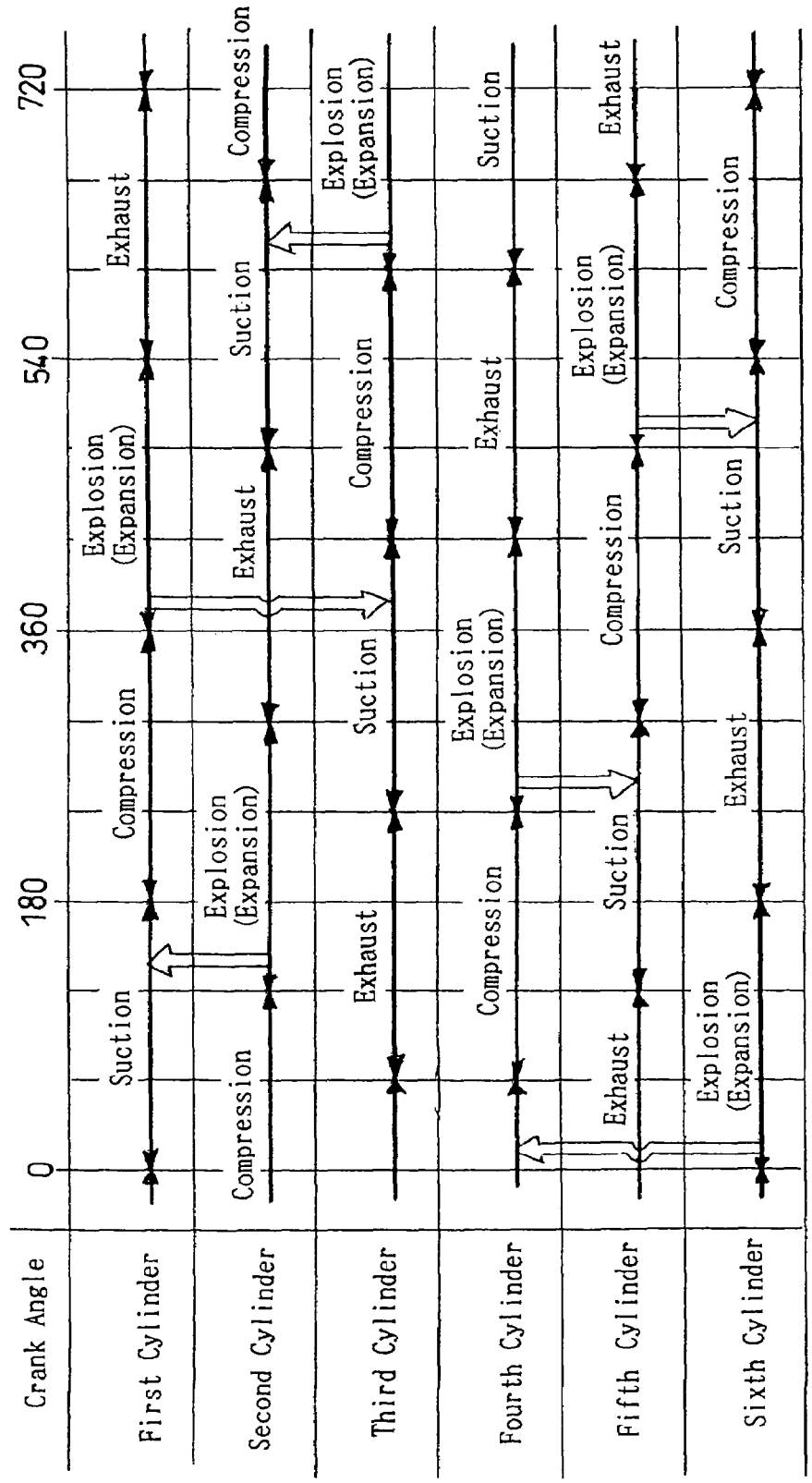
FIG. 8 illustrates strokes in each cylinder of the six-cylinder internal combustion engine.

FIGS. 7 and 8 illustrate a fourth embodiment of the present invention applied to a conventional in-line four-stroke six-cylinder internal combustion engine.

The six-cylinder internal combustion engine 1" comprises a first cylinder A1", a second cylinder A2", a third cylinder A3", a fourth cylinder A4", a fifth cylinder A5" and a sixth cylinder A6" which share a non-illustrated single crank shaft and which are arranged in a row extending along a crank axis 4".

As in the first embodiment, each of the six cylinders is provided with a cylinder bore, a piston, a combustion chamber, a spark plug, intake ports with intake valves, exhaust ports with exhaust valves, and a fuel injection valve.

As seen from the stroke chart shown in FIG. 7, ignition in the cylinders A1", A2", A3", A4", A5" and A6" of the six-cylinder internal combustion engine 1" is performed in the order of the first cylinder A1", the fifth cylinder A5", the third cylinder A3", the sixth cylinder A6", the second cylinder A2" and then the fourth cylinder A4".

A first communication path 14a" is common to the first cylinder A1", the second cylinder A2" and the third cylinder A3", while a second communication path 14b" is common to the fourth cylinder A4", the fifth cylinder A5" and the sixth cylinder A6". These common paths extend along the row of the cylinders A1", A2", A3", A4", A5" and A6". Each of the communication paths 14a" and 14b" is connected to combustion chambers of the relevant cylinders via branch communication paths 15". Each branch communication path 15" is provided with an open/close valve 16" which, as in the first embodiment, is opened for a predetermined period of time at an earlier stage of the combustion (expansion) stroke and a later stage of the suction stroke of the relevant cylinder in accordance with the rotation of the crank shaft.

With the above arrangement, part of the combustion (expansion) gas in the first cylinders A1" can be taken out at an earlier stage in its explosion (expansion) stroke and introduced into the third cylinder A3" in a suction stroke through the first communication path 14a". Part of the combustion (expansion) gas in the fifth cylinders A5" can be taken out at an earlier stage in its explosion (expansion) stroke and introduced into the sixth cylinder A6" in a suction stroke through the second communication path 14b". Part of the combustion (expansion) gas in the third cylinders A3" can be taken out at an earlier stage in its explosion (expansion) stroke and introduced into the second cylinder A2" in a suction stroke through the first communication path 14a". Part of the combustion (expansion) gas in the sixth cylinders A6" can be taken out at an earlier stage in its explosion (expansion) stroke and introduced into the fourth cylinder A4" in a suction stroke through the second communication path 14b". Part of the combustion (expansion) gas in the second cylinder A2" can be taken out at an earlier stage in its explosion (expansion) stroke and introduced into the first cylinder A1" in a suction stroke through the first communication path 14a". Part of the combustion (expansion) gas in the fourth cylinder A4" can be taken out at an earlier stage in its explosion (expansion) stroke and introduced into the fifth cylinder A5" in a suction stroke through the second communication path 14b".

In the fourth embodiment again, the open/close valve 16" of each of the six cylinders A1", A2", A3", A4", A5" and A6" may be provided with ion current detecting means, as in the first embodiment, so that the valve is opened when the detected ion current exceeds a predetermined value. Further, the compression ratio in each cylinder is set high, and part of combustion (expansion) gas of one cylinder is introduced into another cylinder in the high-load operation mode.

The present invention is applicable to a V-type six-cylinder or eight-cylinder internal combustion engine, in which case a communication path common to three or four cylinders is provided for each cylinder block.

Further, the present invention is not limited to a four-stroke multicylinder internal combustion engine burning gasoline, but applicable to a two-stroke multicylinder internal combustion engine or a compression-ignition type multicylinder internal combustion engine such as a diesel engine.

The invention claimed is:

1. A multicylinder internal combustion engine provided with a plurality of cylinders sharing a single crankshaft, wherein a compression ratio in each of the cylinders is set to such a high value as would lead to abnormal combustion such as knocking during high-load operation, the engine further comprising a load sensor for detecting a load of the engine, and a controller connected to the load sensor for causing part of combustion (expansion) gas to be taken out from one of the cylinders at an earlier stage of an explosion (expansion) stroke and introduced into another cylinder of the remaining cylinders in a suction stroke or compression stroke through a communication path only when the load sensor detects the high-load operation of the engine.

2. A multicylinder internal combustion engine provided with a plurality of cylinders sharing a single crankshaft, each of the cylinders being provided with an exhaust port, the engine comprising a single common communication path provided separately from the exhaust port of each cylinder and extending along a row of the cylinders, wherein the common communication path is connected to combustion chambers of the respective cylinders via individual communication paths provided for the cylinders, the individual communication paths of the cylinders being provided with open/close valves, the valves being opened at an earlier stage of an explosion (expansion) stroke of the relevant cylinders so that part of combustion (expansion) gas produced in one of the cylinders is introduced into another one of the cylinders in a suction or compression stroke.

3. The multicylinder internal combustion engine according to claim 2, wherein each cylinder is provided with an ion current detector for detecting ion current in combustion (expansion) gas during the explosion (expansion) stroke of the cylinder so tat the open/close valve of the cylinder opens when the ion current in one of the cylinders is determined to be high based on a detection signal from the ion current detector.

4. The multicylinder internal combustion engine according to claim 2, wherein the individual communication path for each of the cylinders has an opening to the combustion chamber, the opening comprising a swirl port for causing the combustion (expansion) gas entering through the opening to flow in a swirling manner circumferentially of the cylinder.

5. The multicylinder internal combustion engine according to claim 2, wherein the individual communication path for each of the cylinders is provided with a plurality of openings to the combustion chamber.

6. The multicylinder internal combustion engine claim 2, wherein each of the cylinders is provided with a fuel injection valve for injecting fuel into a cylinder bore of the cylinder.

7. The multicylinder internal combustion engine according claim 2, wherein the common communication path is provided in a cylinder head.

8. The multicylinder internal combustion engine according to claim 2, wherein the open/close valve of the individual communication path for each cylinder comprises a poppet valve.

9. A multicylinder internal combustion engine provided with a plurality of cylinders sharing a single crankshaft, the engine comprising a single common communication path extending along a row of the cylinders, wherein the common communication path is connected to combustion chambers of the respective cylinders via individual communication paths provided for the cylinders, the individual communication paths of the cylinders being provided with open/close valves, the valves being opened at an earlier stage of an explosion (expansion) stroke of the relevant cylinders so that part of combustion (expansion) gas produced in one of the cylinders is introduced into another one of the cylinders in a suction or compression stroke;

wherein each cylinder is provided with an ion current detector for detecting ion current in combustion (expansion) gas during the explosion (expansion) stroke of the cylinder so that the open/close valve of the cylinder opens when the ion current in one of the cylinders is determined to be high based on a detection signal from the ion current detector.

10. A multicylinder internal combustion engine provided with a plurality of cylinders sharing a single crankshaft the engine comprising a single common communication path extending along a row of the cylinders, wherein the common communication path is connected to combustion chambers of the respective cylinders via individual communication paths provided for cylinders, the individual communication paths of the cylinders being provided with open/close valves, the valves being opened at an earlier stage of an explosion (expansion) stroke of the relevant cylinders so that part of combustion (expansion) gas produced in one of the cylinders is introduced into another one of the cylinders in a suction or compression stroke;

wherein the individual communication path for each of the cylinders is provided with a plurality of openings to the combustion chamber.

* * * * *